United States Patent
Capper et al.

(10) Patent No.: US 12,385,638 B2
(45) Date of Patent: Aug. 12, 2025

(54) ELECTRONIC PRESSURE AUGMENTED MODULATION

(71) Applicant: Emerson Electric Co., St. Louis, MO (US)

(72) Inventors: Weston S. Capper, House Springs, MO (US); Daniel L Furmanek, Ballwin, MO (US); Ryan Jensen, St. Louis, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 423 days.

(21) Appl. No.: 18/114,542

(22) Filed: Feb. 27, 2023

(65) Prior Publication Data
US 2024/0288164 A1     Aug. 29, 2024

(51) Int. Cl.
*F23N 1/00*     (2006.01)
*G05D 16/00*     (2006.01)
*G05D 16/20*     (2006.01)

(52) U.S. Cl.
CPC .......... *F23N 1/002* (2013.01); *G05D 16/028* (2019.01); *G05D 16/202* (2013.01); *F23N 2225/06* (2020.01); *F23N 2235/16* (2020.01)

(58) Field of Classification Search
CPC .. F23N 1/002; F23N 2225/06; F23N 2235/16; G05D 16/028; G05D 16/202
USPC .......................................................... 431/19
See application file for complete search history.

(56) References Cited

U.S. PATENT DOCUMENTS

| | | | |
|---|---|---|---|
| 4,645,450 A | 2/1987 | West | |
| 5,562,089 A * | 10/1996 | Astle, Jr. ................. | F23L 15/02 126/91 A |
| 5,601,071 A | 2/1997 | Carr et al. | |
| 5,658,140 A * | 8/1997 | Kondou .................. | F23N 5/242 431/31 |
| 9,134,026 B2 * | 9/2015 | Blaauwwiekel ........ | F23N 3/085 |
| 9,234,661 B2 | 1/2016 | Young et al. | |
| 10,520,186 B2 * | 12/2019 | Langius ................... | F23D 14/22 |
| 2003/0059730 A1 * | 3/2003 | Sigafus ................... | F23N 5/203 431/18 |
| 2019/0376687 A1 * | 12/2019 | Super ...................... | F23N 1/022 |

OTHER PUBLICATIONS

Direct Ignition Combinaton 2-Stage Gas Control (24 Vac); supplyhouse.com; accessed Feb. 2, 2023, 4 pages.
Trane XC95M Furnace Review; Trane.com; Technology & Benefits; Fire & Ice Heating & Air Conditioning, Inc.; Aug. 18, 2020; 14 pages.
36J Stepper Gas Control Product Information; White-Rodgers/Emerson; Copyright 2022; 12 pages.
Modulation Technology FAQs; Emerson Climate Technologies; accessed Feb. 2, 2023; 6 pages.

* cited by examiner

*Primary Examiner* — Avinash A Savani
(74) *Attorney, Agent, or Firm* — Harness, Dickey & Pierce, P.L.C.; Anthony G. Fussner

(57) ABSTRACT

Exemplary embodiments are disclosed of systems including electronic differential pressure sensors for electronically controlling stepper gas valves to modulate fuel flow in PAM combustion systems (e.g., PAM furnace systems, etc.). Also disclosed are exemplary methods for electronically modulating fuel flow in pressure augmented modulation (PAM) combustion systems.

31 Claims, 8 Drawing Sheets

ELECTRONIC PRESSURE AUGMENTED MODULATION

FIELD

The present disclosure generally relates to systems including electronic differential pressure sensors for electronically controlling stepper gas valves to modulate fuel flow in PAM combustion systems (e.g., PAM furnace systems, etc.) and methods for electronically modulating fuel flow in pressure augmented modulation (PAM) combustion systems.

BACKGROUND

This section provides background information related to the present disclosure which is not necessarily prior art.

In a conventional pressure augmented modulation (PAM) combustion system 101 as shown in FIG. 1, vacuum hoses/tubes 105 are routed from both the burner box 109 and the heat exchanger 113 to a mechanical modulating gas valve 117. The difference in pressure between the burner box 109 and the heat exchanger 113 is measured and used to mechanically modulate outlet pressure of the gas valve 117.

DRAWINGS

The drawings described herein are for illustrative purposes only of selected embodiments and not all possible implementations, and are not intended to limit the scope of the present disclosure.

FIG. 1 illustrates a conventional plumbing configuration for a pressure augmented modulation (PAM) combustion system in which vacuum hoses/tubes are routed from both a burner box and a heat exchanger to a mechanical modulating gas valve.

FIG. 2 includes different views of the conventional mechanical modulating gas valve shown in FIG. 1.

Corresponding reference numerals may indicate corresponding (though not necessarily identical) parts throughout the several views of the drawings.

DETAILED DESCRIPTION

Example embodiments will now be described more fully with reference to the accompanying drawings.

Figure 1:
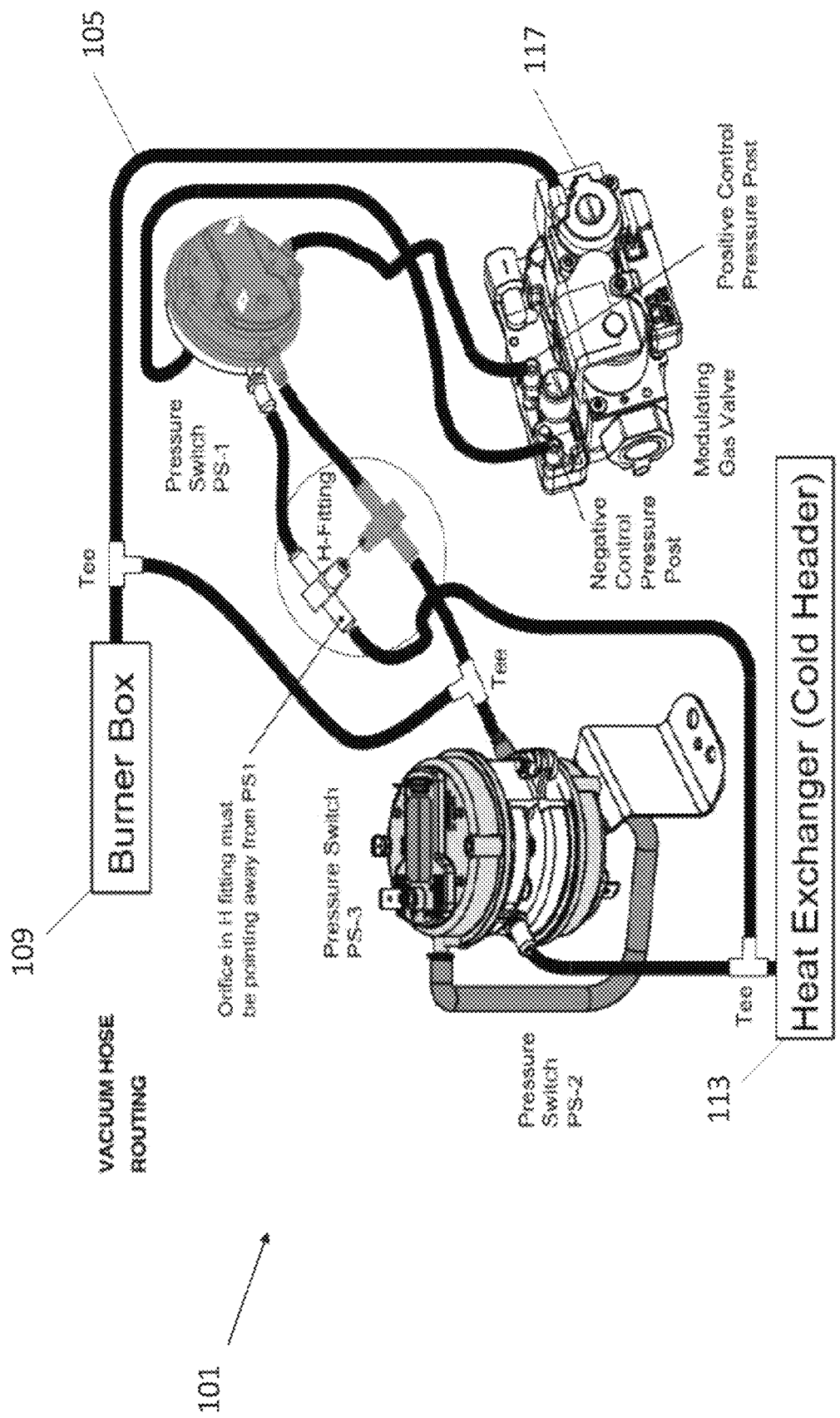

FIG. 1 illustrates a conventional plumbing configuration for a pressure augmented modulation (PAM) combustion system 101 in which vacuum hoses/tubes 105 are routed from both a burner box 109 and a heat exchanger 113 to a mechanical modulating gas valve 117. The difference in pressure between the burner box 109 and the heat exchanger 113 is measured and used to mechanically modulate outlet pressure of the gas valve 117. The pressure differential measurement is accomplished by the running hoses/tubes 105 from the burner box 109 and the heat exchanger 113 to respective positive and negative control pressure posts on the PAM gas valve body.

Figure 3:
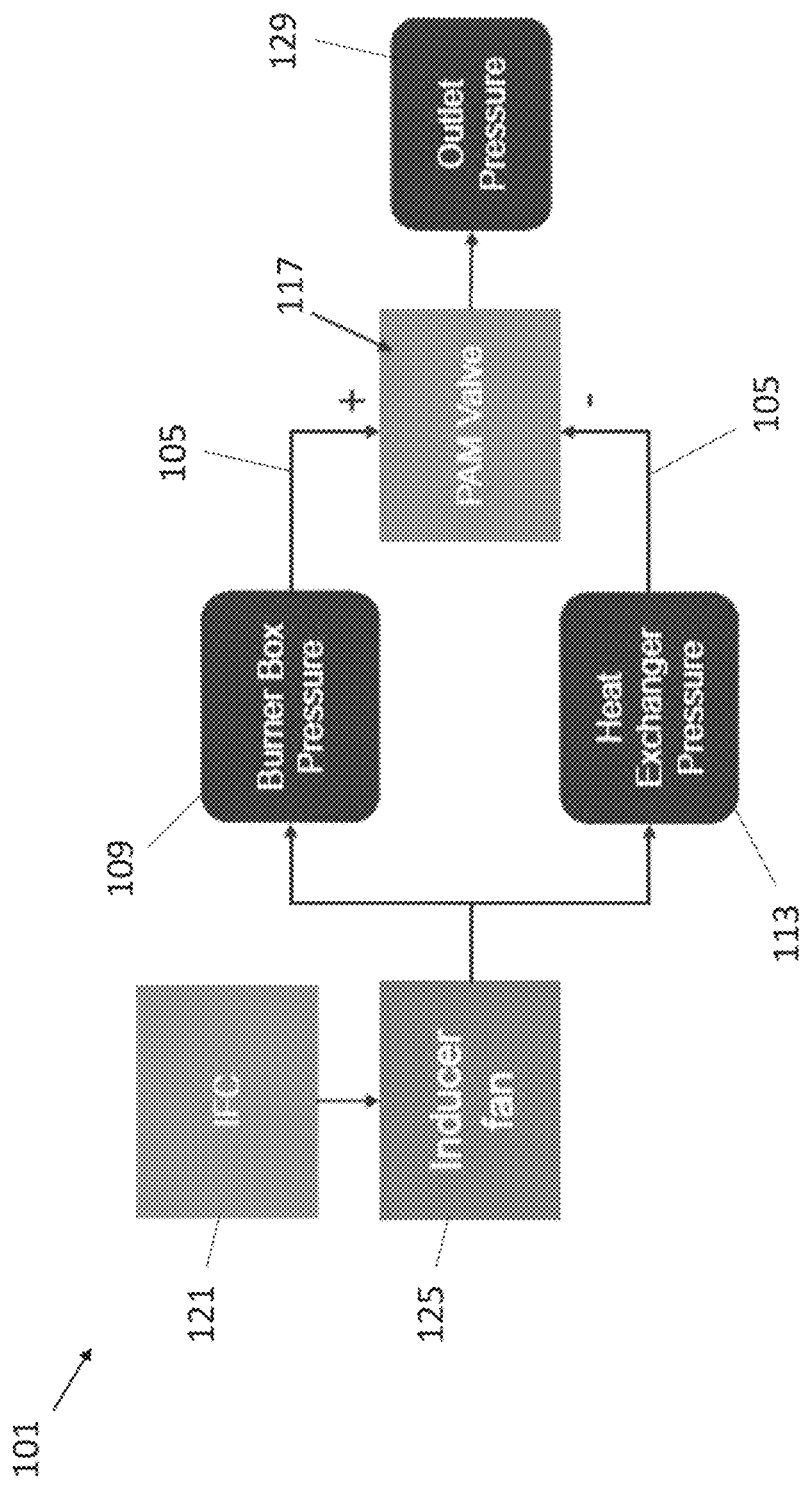
FIG. 3 is a block diagram illustrating a conventional PAM combustion system including an integrated furnace control (IFC), an inducer fan, and the plumbing configuration shown in FIG. 1 in which the vacuum hoses/tubes are routed from both the burner box and the heat exchanger to the mechanical modulating gas valve.

FIG. 3 illustrates the conventional PAM combustion system 101 including an integrated furnace control (IFC) 121, an inducer fan 125, and the plumbing configuration shown in FIG. 1. The IFC 121 is used to modulate blower speed. As the blower speed changes, the pressure difference between the heat exchanger 109 and the burner box 113 will change based on a set relationship. In this conventional PAM setup, the pressure difference is fed into the gas valve 117 and used to mechanically modulate the outlet pressure 129 of the gas valve 117. But as recognized herein, the modulation is mechanically performed internal to the gas valve 117, which tends to make the mechanical modulation gas valve 117 relatively expensive.

After recognizing the above, exemplary embodiments were developed and/or are disclosed herein that include electronical differential pressure sensors for electronically controlling stepper gas valves to modulate fuel flow (e.g., natural gas, propane, methane, etc.) for pressure augmented modulation (PAM) combustion systems (e.g., PAM furnace systems, etc.).

Figure 2:
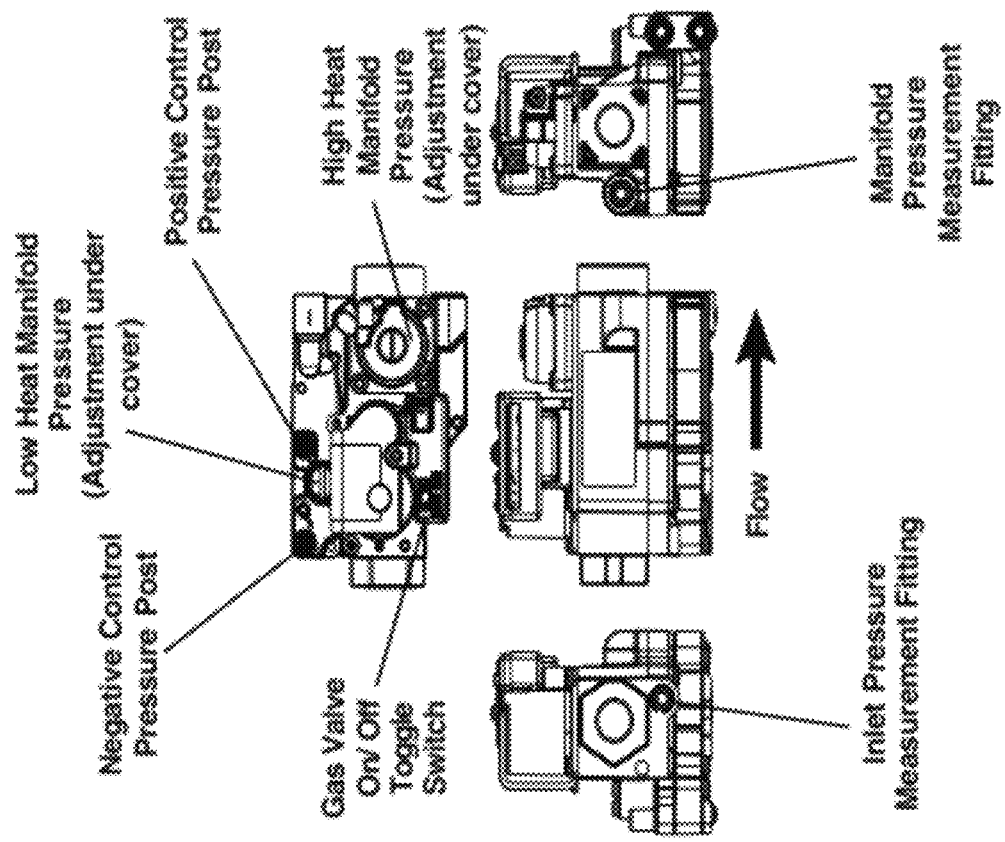
Figure 4:
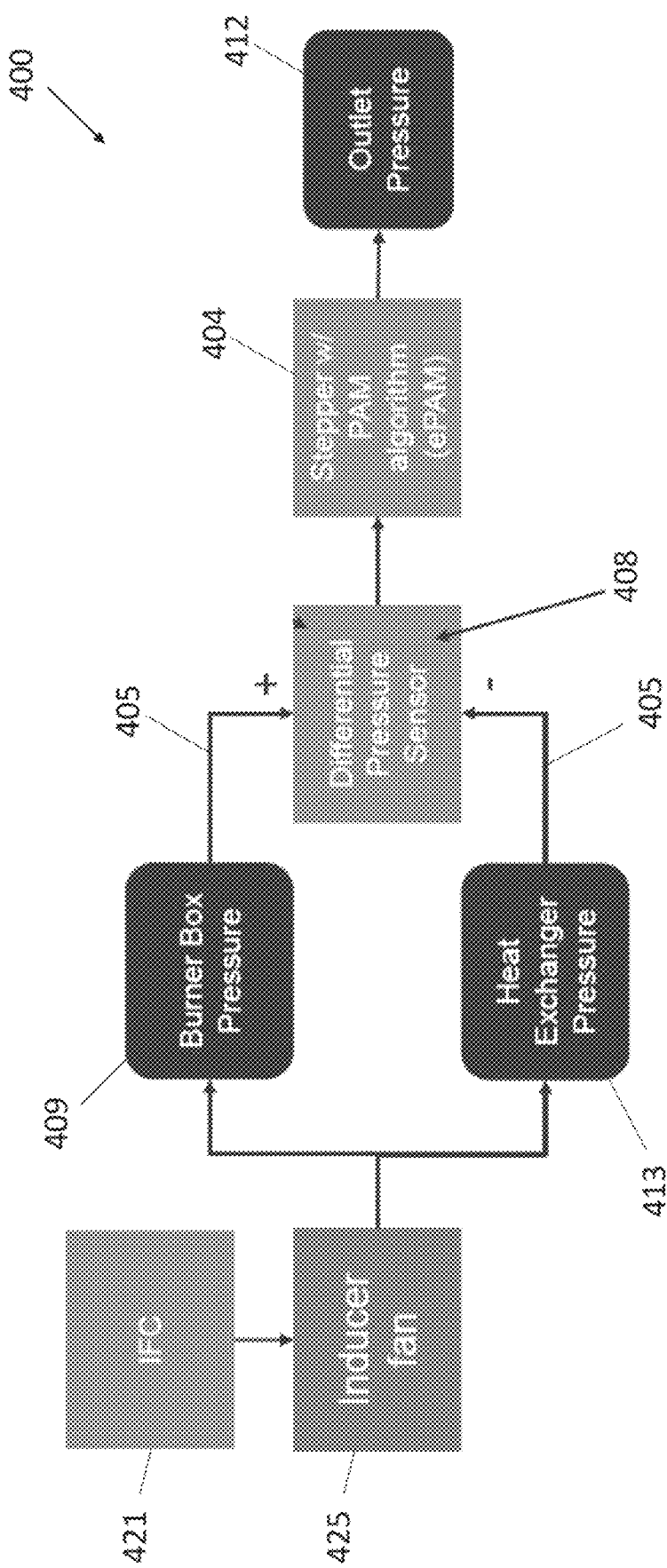
FIG. 4 is a block diagram illustrating an exemplary embodiment of a PAM combustion system in which a differential pressure sensor and stepper gas valve have replaced the conventional mechanical PAM gas valve shown in FIG. 3.

In exemplary embodiments, the conventional mechanical PAM gas valve 117 shown in FIGS. 1, 2, and 3 is replaced with a stepper gas valve and an electronic differential pressure sensor, e.g., on a printed circuit board (PCB), etc. For example, FIG. 4 illustrates an exemplary embodiment of a PAM combustion system 400 in which a stepper gas valve 404 and differential pressure sensor 408 have replaced the conventional mechanical PAM gas valve 117 shown in FIGS. 1, 2, and 3. The PAM combustion system 400 also includes an integrated furnace control (IFC) 421 (broadly, a controller) and an inducer fan 425.

The stepper gas valve 404 and differential pressure sensor 408 may be used in the PAM combustion system 400 that includes the same, similar, or existing plumbing as shown in FIG. 1. The pressure difference between the burner box 409 and the heat exchanger 413 may be measured or read by running the hoses 405 (e.g., existing hoses 105 from the burner box 109 and heat exchanger 113 shown in FIG. 1, etc.) to the single electronic differential pressure sensor 408. The sensor's electronic signal can then be used to command or instruct the stepper gas valve 404 (e.g., 36J stepper gas valve from Emerson Electric Co., stepper gas valve (FIGS. 6-8), other stepper gas valve, etc.) to an outlet pressure 412.

Figure 5:
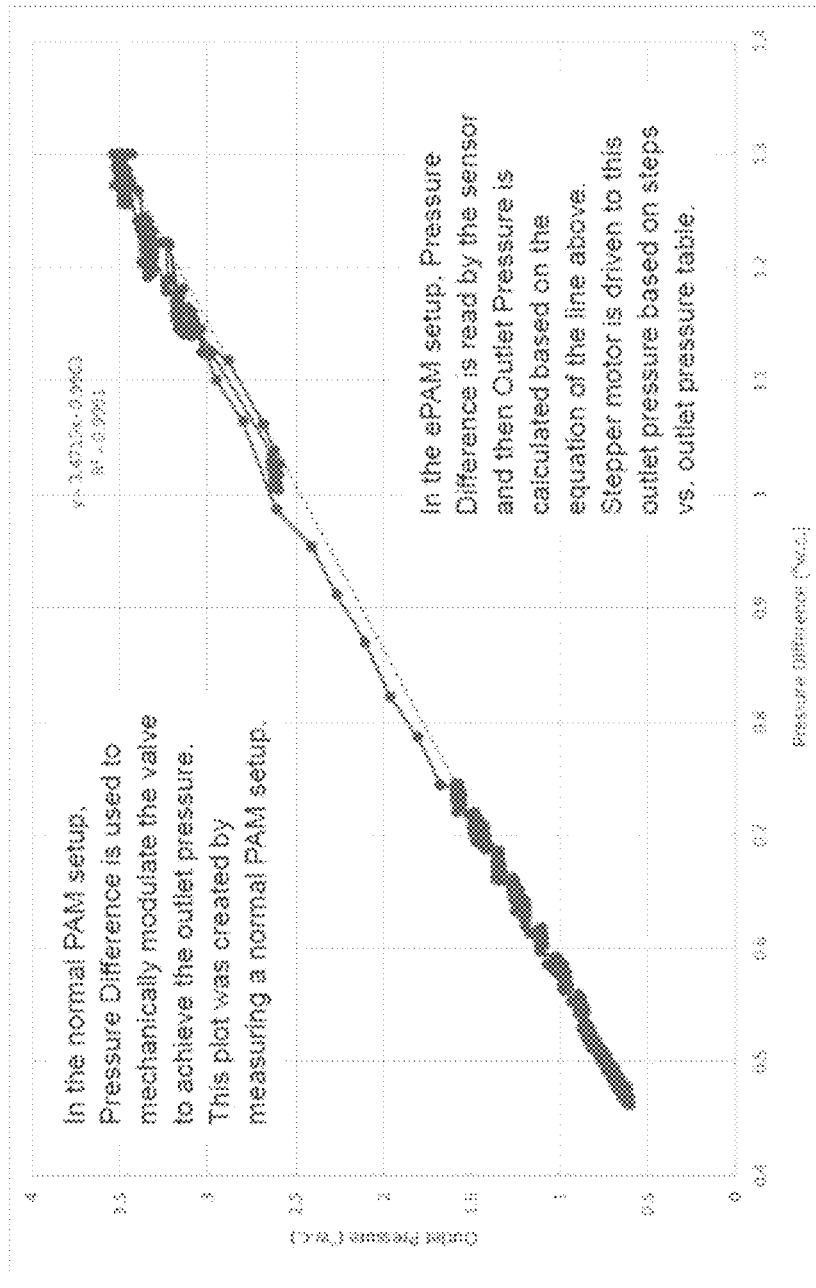
FIG. 5 is a line graph of outlet pressure in water column (w.c.) versus pressure difference in water column as measured between the burner box and heat exchanger of a conventional PAM combustion system such as shown in FIGS. 1 and 3.

The pressure difference between the burner box 409 and heat exchanger 413 has a set relationship to blower speed and a set relationship to desired outlet pressure (e.g., FIG. 5, etc.). In exemplary embodiments, the desired outlet pressure is calculated or looked-up (e.g., in a lookup table, etc.) based on the pressure difference measured or obtained by the electronic different pressure sensor 408 between the burner box 409 and the heat exchanger 413. The stepper gas valve 404 may then be commanded or instructed to the desired outlet pressure as calculated or looked-up based on the measured pressure difference based on the stepper gas valve's steps/outlet pressure calibration table.

Advantageously, the stepper gas valve 404 used in exemplary embodiments disclosed herein may be less complex and lower cost than the conventional PAM gas valve 117 shown in FIG. 1. And the stepper gas valve 404 with the addition of a single differential pressure sensor 408 may thus be operable for providing electronic pressure augmented modulation (ePAM) for a PAM combustion system (e.g., a PAM furnace system, etc.). The stepper gas valve 404 and electronic differential pressure sensor 408 may be configured to provide comparable performance as and/or emulate the conventional mechanical PAM gas valve 117 shown in FIGS. 1, 2, and 3 at a lower cost. Accordingly, exemplary embodiments disclosed herein are configured to provide or enable electronic control of PAM combustion systems at a lower cost than the conventional mechanical control currently used for PAM combustion systems.

As noted above, FIG. 1 illustrates a conventional configuration in which the pressure differential measurement is accomplished by running hoses/tubes 105 from the burner box 109 and the heat exchanger 113 to respective positive and negative control pressure posts on the PAM gas valve body. By comparison, FIG. 4 illustrates an exemplary embodiment in which the pressure differential between the burner box 409 and heat exchanger 413 is determined (e.g., read, measured, sensed, etc.) by a single electronic differential pressure sensor 408. And the tubes/hoses 405 that were conventionally routed or run from the burner box 409 and the heat exchanger 413 to the respective positive and negative control pressure posts of the PAM gas valve 117 are instead routed or run to the electronic differential pressure sensor 408.

FIG. 5 is a line graph of outlet pressure in water column (w.c.) versus pressure difference in water column as measured between the burner box and heat exchanger of a conventional PAM combustion system such as shown in FIGS. 1 and 3. As disclosed herein for exemplary embodiments, pressure difference between the burner box and heat exchanger is read by an electronic differential pressure sensor and then the outlet pressure for the stepper gas valve is calculated or determined based on the linear graph equation. The stepper motor of the stepper gas valve may then be driven into a position at which the outlet pressure of the stepper gas valve is modulated to the desired outlet pressure. The stepper motor may be driven via onboard electronics based on steps versus an outlet pressure table.

In this example shown in FIG. 5, the linear graph equation was y=3.4715x−0.9963 in which the gradient is 3.4715, the y-intercept is −0.9963, and R-squared ($R^2$)=0.9991. R-squared ($R^2$) is a goodness-of-fit measure for the linear regression model. The R-squared ($R^2$) statistic indicates the percentage of the variance in the dependent variable that the independent variables explain collectively.

In exemplary embodiments, the electronic differential pressure sensor may be located on or otherwise integrated with the stepper gas valve. Advantageously, this would allow the stepper gas valve (and the sensor) to be usable as a drop-in replacement for a mechanical modulating gas valve without requiring modification of an existing integrated furnace control (IFC) of the PAM combustion system (e.g., PAM furnace system, etc.) that was otherwise usable with the replaced mechanical modulating gas valve.

In other exemplary embodiments, the electronic differential pressure sensor may be located on or integrated with a new integrated furnace control (IFC). Advantageously, this would allow an existing stepper gas valve (e.g., 36J stepper gas valve from Emerson Electric Co., other stepper gas valve, etc.) to be used in the PAM combustion system (e.g., PAM furnace system, etc.) without requiring modification of the existing stepper gas valve to include the electronic differential pressure sensor.

Figure 6:
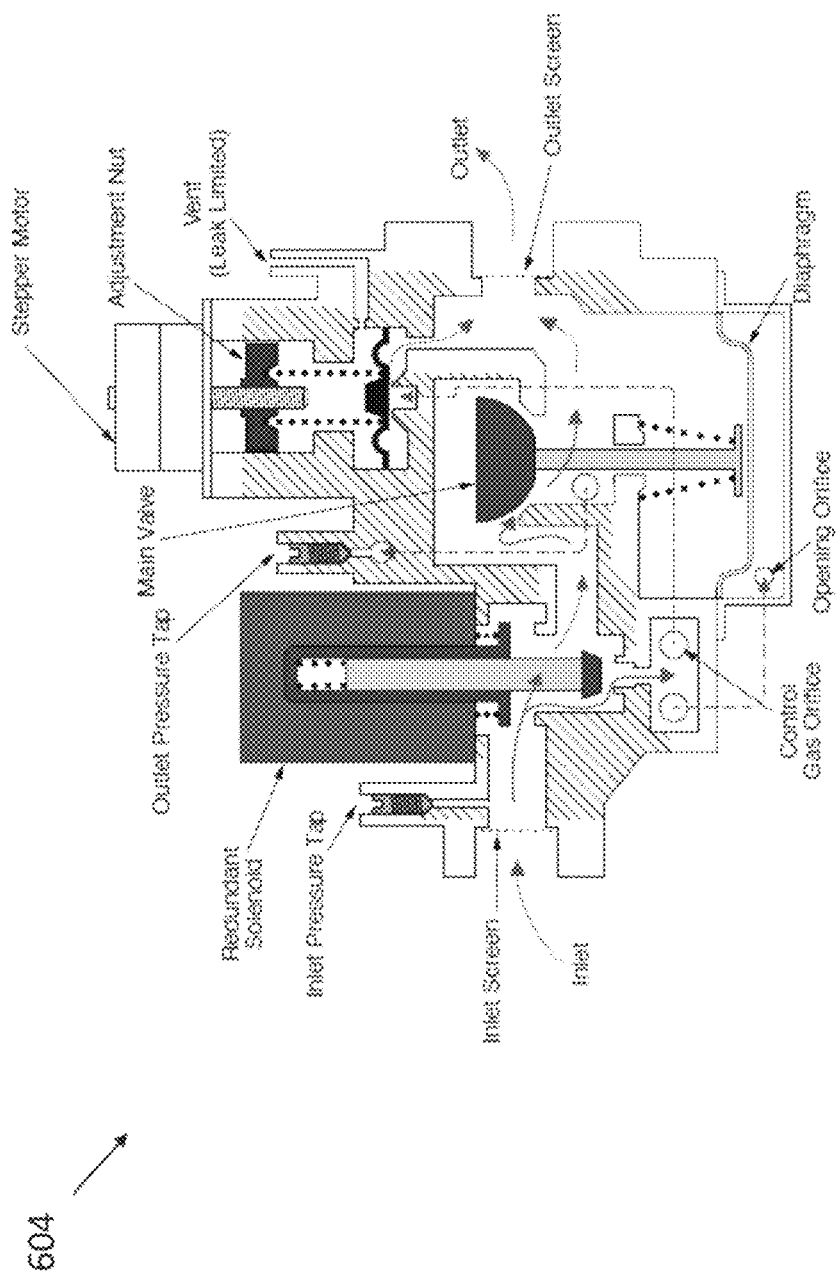
FIG. 6 is a schematic gas flow diagram of an exemplary stepper gas valve that may be used with or integrally include an electronic differential pressure sensor for electronically modulating fuel flow in a pressure augmented modulation (PAM) combustion system according to an exemplary embodiment of the present disclosure.
Figure 7:
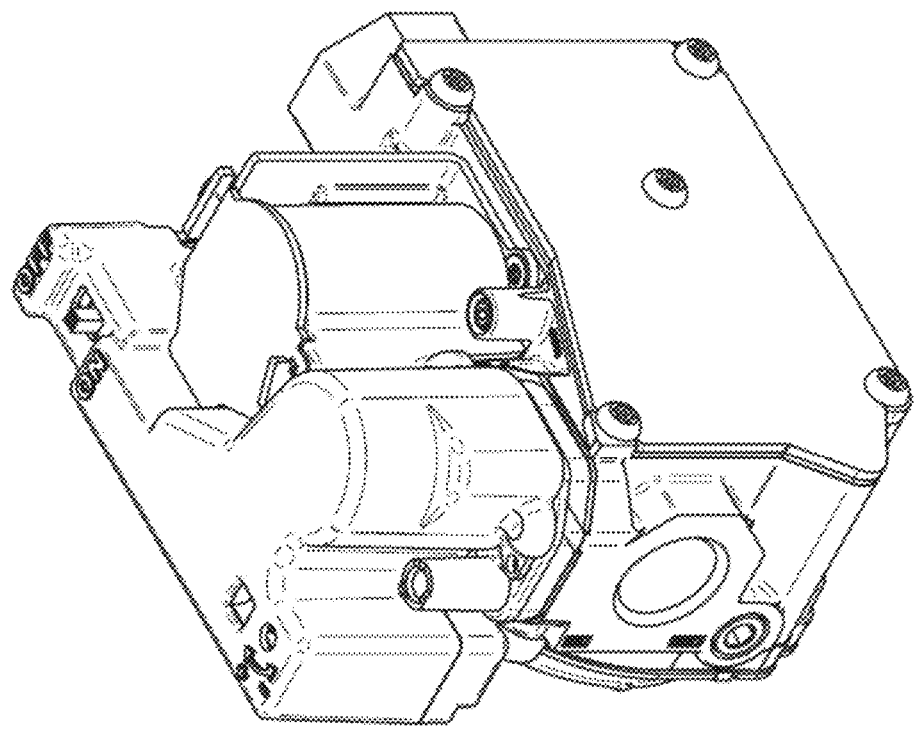
FIG. 7 is a perspective view of the exemplary stepper gas valve shown in FIG. 6.
Figure 8:
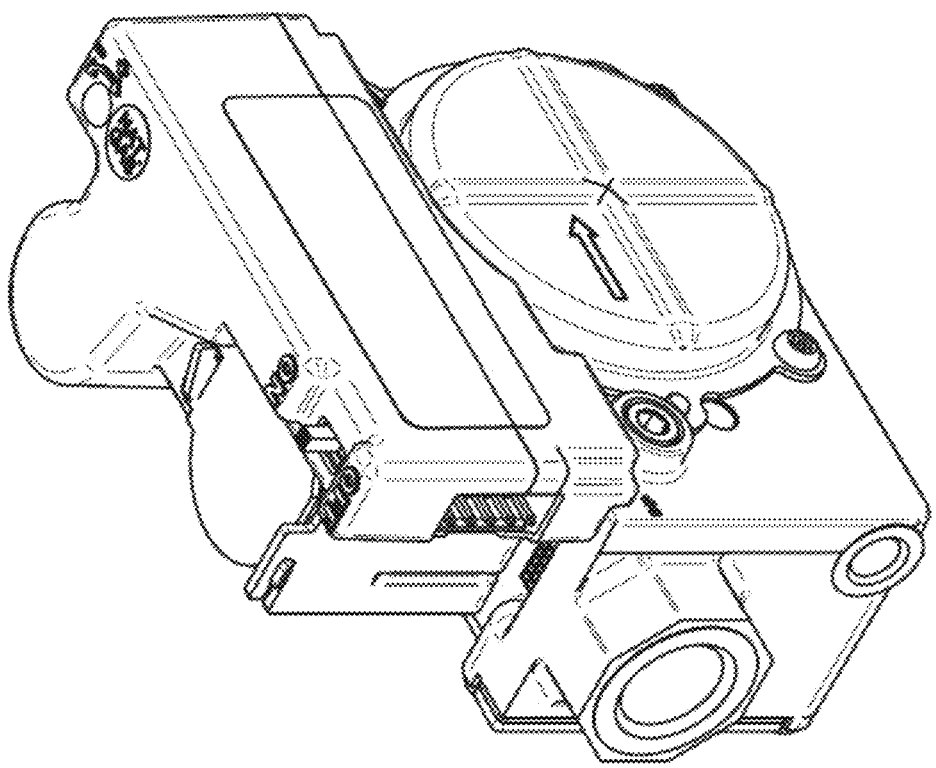
FIG. 8 is a perspective view of the exemplary stepper gas valve shown in FIGS. 6 and 7, and illustrating electrical connections of the stepper gas valve.

By way of example, FIGS. 6-8 illustrate an exemplary stepper gas valve 604 that may be used with or integrally include an electronic differential pressure sensor for electronically modulating fuel flow in a pressure augmented modulation (PAM) combustion system according to an exemplary embodiment of the present disclosure. FIG. 8 illustrates electrical connections of the stepper gas valve including a five pin connector harness interface with the following pin out configuration: Pin 1: TH—Board 24V AC (bottom pin, with the cover pointing up); Pin 2: RX—Communications to Stepper; Pin 3: TX—Communications to IFC; Pin 4: TR ground; and Pin 5: TH—Main Gas valve 24 VAC (top pin, with the cover pointing up). The stepper gas valve shown in FIGS. 6-8 and/or that is used in exemplary embodiments may include one or more features as disclosed Appendix A. The contents of Appendix A is incorporated herein by reference in its entirety.

Exemplary embodiments are disclosed of systems for electronically modulating fuel flow in pressure augmented modulation (PAM) combustion system including burner boxes and a heat exchangers. In exemplary embodiments, an electronic differential pressure sensor is configured to be operable for determining a pressure differential between the burner box and the heat exchanger of the PAM combustion system. A stepper gas valve configured to be operable for modulating its outlet pressure in response to the pressure differential between the burner box and the heat exchanger as determined by the electronic differential pressure sensor.

In exemplary embodiments, the system is configured to be operable for: determining a desired outlet pressure for the stepper gas valve at least partially based on the pressure differential between the burner box and the heat exchanger as determined by the electronic differential pressure sensor; and driving a stepper motor of the stepper gas valve into a position at which the outlet pressure of the stepper gas valve is modulated to the desired outlet pressure. The system may be configured to be operable for driving the stepper motor based on steps versus an outlet pressure table.

In exemplary embodiments, the system is configured to be operable for: algorithmically determining a desired outlet pressure for the stepper gas valve at least partially based on the pressure differential between the burner box and the heat exchanger as determined by the electronic differential pressure sensor; and driving a stepper motor of the stepper gas valve into a position at which the outlet pressure of the stepper gas valve is modulated to the algorithmically determined desired outlet pressure.

In exemplary embodiments, the system is configured to be operable for: looking up a desired outlet pressure for the stepper gas valve at least partially based on the pressure differential between the burner box and the heat exchanger as determined by the electronic differential pressure sensor; and driving a stepper motor of the stepper gas valve into a position at which the outlet pressure of the stepper gas valve is modulated to the looked up desired outlet pressure.

In exemplary embodiments, the system is configured such that the electronic differential pressure sensor is usable for the control of the stepper gas valve to modulate only fuel flow in the PAM combustion system.

In exemplary embodiments, the system is configured such that the electronic differential pressure sensor is usable for the sole purpose of controlling the stepper gas valve to modulate only fuel flow in the PAM combustion system such that the electronic differential pressure sensor is not usable for sensing fuel and air pressures for the purpose of adjusting speed of a combustion blower in the PAM combustion system.

In exemplary embodiments, the system is configured to be operable for algorithmically determining a desired outlet pressure for the stepper gas valve using a linear graph equation of outlet pressure versus pressure difference as measured between a burner box and a heat exchanger of a conventional PAM combustion system including a mechanical modulating gas valve. The system may be configured to be operable for driving a stepper motor of the stepper gas valve into a position at which the outlet pressure of the stepper gas valve is modulated to the algorithmically determined desired outlet pressure. The system may be configured to be operable for driving a stepper motor of the stepper gas valve into a position at which the outlet pressure of the stepper gas valve is modulated to the algorithmically determined desired outlet pressure based on steps versus an outlet pressure table.

In exemplary embodiments, the stepper gas valve and the electronic differential pressure sensor are configured to be usable as a replacement of a mechanical modulating gas valve in the PAM combustion system.

In exemplary embodiments, the electronic differential pressure sensor and the stepper gas valve is configured to be usable with existing tubing routable from the burner box and the heat exchanger to respective positive and negative control pressure posts on the mechanical modulating gas valve body.

In exemplary embodiments, the electronic differential pressure sensor is located on the stepper gas valve thereby allowing the stepper gas valve and the electronic differential pressure sensor located thereon to be usable as a drop-in replacement of the mechanical modulating gas valve in the PAM combustion system without requiring modification of an existing integrated furnace control (IFC) of the PAM combustion system, which said existing IFC was otherwise usable with the replaced mechanical modulating gas valve.

In exemplary embodiments, the electronic differential pressure sensor is located on an integrated furnace control (IFC) of the PAM combustion system thereby allowing the stepper gas valve to be used in the PAM combustion system without requiring modification of the stepper gas valve to include the electronic differential pressure sensor thereon.

In exemplary embodiments, a pressure augmented modulation (PAM) combustion system comprising a burner box, a heat exchanger, an electronic differential pressure sensor operable for determining a pressure differential between the burner box and the heat exchanger, and a stepper gas valve operable for modulating its outlet pressure in response to the pressure differential between the burner box and the heat exchanger as determined by the electronic differential pressure sensor. The PAM combustion system may be configured such that a pressure difference between the burner box and the heat exchanger has a set relationship to blower speed and a set relationship to desired outlet pressure. And the stepper motor valve may include a stepper motor that is drivable into a position at which the outlet pressure of the stepper gas valve is modulated to the desired outlet pressure.

Also disclosed are exemplary methods for electronically modulating fuel flow in pressure augmented modulation (PAM) combustion systems including burner boxes and heat exchangers. In exemplary embodiments, a method includes: providing an electronic differential pressure sensor in the PAM combustion system such that the electronic differential pressure sensor is operable for determining a pressure differential between the burner box and the heat exchanger of the PAM combustion system; and providing a stepper gas valve in the PAM combustion system such that the stepper gas valve is operable for modulating its outlet pressure in response to the pressure differential between the burner box and the heat exchanger as determined by the electronic differential pressure sensor.

In exemplary embodiments, the method includes: using the electronic differential pressure sensor to determine the pressure differential between the burner box and the heat exchanger of the PAM combustion system; and modulating the outlet pressure of the stepper gas valve to a desired outlet pressure in response to the pressure differential between the burner box and the heat exchanger as determined by the electronic differential pressure sensor.

In exemplary embodiments, the method includes: using the electronic differential pressure sensor to determine the pressure differential between the burner box and the heat exchanger of the PAM combustion system; determining a desired outlet pressure for the stepper gas valve at least partially based on the pressure differential between the burner box and the heat exchanger as determined by the electronic differential pressure sensor; and commanding the stepper gas valve to the desired outlet pressure. The step of commanding the stepper gas valve to the desired outlet pressure may include driving a stepper motor of the stepper gas valve into a position at which the outlet pressure of the stepper gas valve is modulated to the desired outlet pressure. And the step of driving the stepper motor of the stepper gas valve into the position at which the outlet pressure of the stepper gas valve is modulated to the desired outlet pressure may include driving the stepper motor based on steps versus an outlet pressure table.

In exemplary embodiments, the method includes: algorithmically determining a desired outlet pressure for the stepper gas valve based on the pressure differential between the burner box and the heat exchanger as determined by the electronic differential pressure sensor; and driving a stepper motor of the stepper gas valve into a position at which the outlet pressure of the stepper gas valve is modulated to the algorithmically determined desired outlet pressure.

In exemplary embodiments, the method includes: looking up the desired outlet pressure for the stepper gas valve based on the pressure differential between the burner box and the heat exchanger as determined by the electronic differential pressure sensor; and driving a stepper motor of the stepper gas valve into a position at which the outlet pressure of the stepper gas valve is modulated to the looked up desired outlet pressure.

In exemplary embodiments, the method includes using the electronic differential pressure sensor to control the stepper gas valve to modulate only fuel flow in the PAM combustion system.

In exemplary embodiments, the method includes using the electronic differential pressure sensor for the sole purpose of controlling the stepper gas valve to modulate only fuel flow in the PAM combustion system such that the electronic differential pressure sensor is not used for sensing fuel and air pressures for the purpose of adjusting speed of a combustion blower in the PAM combustion system.

In exemplary embodiments, the method includes: using the electronic differential pressure sensor to determine the pressure differential between the burner box and the heat exchanger of the PAM combustion system; and algorithmically determining a desired outlet pressure for the stepper gas valve using a linear graph equation of outlet pressure versus pressure difference as measured between a burner box and a heat exchanger of a conventional PAM combustion system including a mechanical modulating gas valve.

In exemplary embodiments, the method includes driving a stepper motor of the stepper gas valve into a position at which the outlet pressure of the stepper gas valve is modulated to the algorithmically determined desired outlet pressure.

In exemplary embodiments, the method includes using the stepper gas valve and the electronic differential pressure sensor instead of and as a replacement of a mechanical modulating gas valve in the PAM combustion system.

In exemplary embodiments, the method includes using existing tubing in the PAM combustion system for the electronic differential pressure sensor and the stepper gas valve, which said existing tubing was otherwise routable from the burner box and the heat exchanger to respective positive and negative control pressure posts on the mechanical modulating gas valve body.

In exemplary embodiments, the electronic differential pressure sensor is located on the stepper gas valve thereby allowing the stepper gas valve and the electronic differential pressure sensor located thereon to be usable as a drop-in replacement of the mechanical modulating gas valve in the PAM combustion system without requiring modification of an existing integrated furnace control (IFC) of the PAM combustion system, which said existing IFC was otherwise usable with the replaced mechanical modulating gas valve.

In exemplary embodiments, the electronic differential pressure sensor is located on an integrated furnace control (IFC) of the PAM combustion system thereby allowing the stepper gas valve to be used in the PAM combustion system without requiring modification of the stepper gas valve to include the electronic differential pressure sensor thereon.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for electronically modulating fuel flow in a pressure augmented modulation (PAM) combustion system including a burner box and a heat exchanger, the system comprising:
   an electronic differential pressure sensor configured to be operable for determining a pressure differential between the burner box and the heat exchanger of the PAM combustion system; and
   a stepper gas valve configured to be operable for modulating its outlet pressure in response to the pressure differential between the burner box and the heat exchanger as determined by the electronic differential pressure sensor;
   wherein the stepper gas valve and the electronic differential pressure sensor are configured to be usable as a replacement of a mechanical modulating gas valve in the PAM combustion system; and
   wherein the electronic differential pressure sensor and the stepper gas valve are configured to be usable with existing tubing routable from the burner box and the heat exchanger to respective positive and negative control pressure posts of the mechanical modulating gas valve.

2. The system of claim 1, wherein the system is configured to be operable for:
   determining a desired outlet pressure for the stepper gas valve at least partially based on the pressure differential between the burner box and the heat exchanger as determined by the electronic differential pressure sensor; and
   driving a stepper motor of the stepper gas valve into a position at which the outlet pressure of the stepper gas valve is modulated to the desired outlet pressure.

3. The system of claim 2, wherein the system is configured to be operable for driving the stepper motor based on steps versus an outlet pressure table.

4. The system of claim 1, wherein the system is configured to be operable for:
   algorithmically determining a desired outlet pressure for the stepper gas valve at least partially based on the pressure differential between the burner box and the heat exchanger as determined by the electronic differential pressure sensor; and
   driving a stepper motor of the stepper gas valve into a position at which the outlet pressure of the stepper gas valve is modulated to the algorithmically determined desired outlet pressure.

5. The system of claim 1, wherein the system is configured to be operable for:
   looking up a desired outlet pressure for the stepper gas valve at least partially based on the pressure differential between the burner box and the heat exchanger as determined by the electronic differential pressure sensor; and
   driving a stepper motor of the stepper gas valve into a position at which the outlet pressure of the stepper gas valve is modulated to the looked up desired outlet pressure.

6. The system of claim 1, wherein the system is configured such that the electronic differential pressure sensor is usable for the control of the stepper gas valve to modulate only fuel flow in the PAM combustion system.

7. A system for electronically modulating fuel flow in a pressure augmented modulation (PAM) combustion system including a burner box and a heat exchanger, the system comprising:
   an electronic differential pressure sensor configured to be operable for determining a pressure differential between the burner box and the heat exchanger of the PAM combustion system; and
   a stepper gas valve configured to be operable for modulating its outlet pressure in response to the pressure differential between the burner box and the heat exchanger as determined by the electronic differential pressure sensor;
   wherein the system is configured such that the electronic differential pressure sensor is usable for the sole purpose of controlling the stepper gas valve to modulate only fuel flow in the PAM combustion system such that the electronic differential pressure sensor is not usable for sensing fuel and air pressures for the purpose of adjusting speed of a combustion blower in the PAM combustion system.

8. A system for electronically modulating fuel flow in a pressure augmented modulation (PAM) combustion system including a burner box and a heat exchanger, the system comprising:
   an electronic differential pressure sensor configured to be operable for determining a pressure differential between the burner box and the heat exchanger of the PAM combustion system; and
   a stepper gas valve configured to be operable for modulating its outlet pressure in response to the pressure differential between the burner box and the heat exchanger as determined by the electronic differential pressure sensor;
   wherein the system is configured to be operable for algorithmically determining a desired outlet pressure for the stepper gas valve using a linear graph equation of outlet pressure versus pressure difference as measured between a burner box and a heat exchanger of a conventional PAM combustion system including a mechanical modulating gas valve.

9. The system of claim 8, wherein the system is configured to be operable for driving a stepper motor of the stepper gas valve into a position at which the outlet pressure of the stepper gas valve is modulated to the algorithmically determined desired outlet pressure.

10. The system of claim 8, wherein the system is configured to be operable for driving a stepper motor of the stepper gas valve into a position at which the outlet pressure of the stepper gas valve is modulated to the algorithmically determined desired outlet pressure based on steps versus an outlet pressure table.

11. The system of claim 8, wherein the stepper gas valve and the electronic differential pressure sensor are configured to be usable as a replacement of a mechanical modulating gas valve in the PAM combustion system.

12. The system of claim 11, wherein the electronic differential pressure sensor and the stepper gas valve are configured to be usable with existing tubing routable from the burner box and the heat exchanger to respective positive and negative control pressure posts of the mechanical modulating gas valve.

13. A system for electronically modulating fuel flow in a pressure augmented modulation (PAM) combustion system including a burner box and a heat exchanger, the system comprising:
   an electronic differential pressure sensor configured to be operable for determining a pressure differential between the burner box and the heat exchanger of the PAM combustion system; and a stepper gas valve configured to be operable for modulating its outlet pressure in response to the pressure differential between the burner box and the heat exchanger as determined by the electronic differential pressure sensor;

wherein the stepper gas valve and the electronic differential pressure sensor are configured to be usable as a replacement of a mechanical modulating gas valve in the PAM combustion system; and wherein the electronic differential pressure sensor is located on the stepper gas valve thereby allowing the stepper gas valve and the electronic differential pressure sensor located thereon to be usable as a drop-in replacement of the mechanical modulating gas valve in the PAM combustion system without requiring modification of an existing integrated furnace control (IFC) of the PAM combustion system, which said existing IFC was otherwise usable with the replaced mechanical modulating gas valve.

14. The system of claim 11, wherein the electronic differential pressure sensor is located on an integrated furnace control (IFC) of the PAM combustion system thereby allowing the stepper gas valve to be used in the PAM combustion system without requiring modification of the stepper gas valve to include the electronic differential pressure sensor thereon.

15. A pressure augmented modulation (PAM) combustion system comprising a burner box, a heat exchanger, and the system of claim 1, wherein the electronic differential pressure sensor is operable for determining a pressure differential between the burner box and the heat exchanger, and the stepper gas valve is operable for modulating its outlet pressure in response to the pressure differential between the burner box and the heat exchanger as determined by the electronic differential pressure sensor.

16. A pressure augmented modulation (PAM) combustion system comprising a burner box, a heat exchanger, and a system for electronically modulating fuel flow in the PAM combustion system, the system comprising:

an electronic differential pressure sensor configured to be operable for determining a pressure differential between the burner box and the heat exchanger of the PAM combustion system; and a stepper gas valve configured to be operable for modulating its outlet pressure in response to the pressure differential between the burner box and the heat exchanger as determined by the electronic differential pressure sensor;

wherein:

the electronic differential pressure sensor is operable for determining a pressure differential between the burner box and the heat exchanger, and the stepper gas valve is operable for modulating its outlet pressure in response to the pressure differential between the burner box and the heat exchanger as determined by the electronic differential pressure sensor;

the PAM combustion system is configured such that a pressure difference between the burner box and the heat exchanger has a set relationship to blower speed and a set relationship to desired outlet pressure; and the stepper gas valve includes a stepper motor that is drivable into a position at which the outlet pressure of the stepper gas valve is modulated to the desired outlet pressure.

17. A method for electronically modulating fuel flow in a pressure augmented modulation (PAM) combustion system including a burner box and a heat exchanger, the method comprising:

providing an electronic differential pressure sensor in the PAM combustion system such that the electronic differential pressure sensor is operable for determining a pressure differential between the burner box and the heat exchanger of the PAM combustion system;

providing a stepper gas valve in the PAM combustion system such that the stepper gas valve is operable for modulating its outlet pressure in response to the pressure differential between the burner box and the heat exchanger as determined by the electronic differential pressure sensor;

using the stepper gas valve and the electronic differential pressure sensor instead of and as a replacement of a mechanical modulating gas valve in the PAM combustion system; and using existing tubing in the PAM combustion system for the electronic differential pressure sensor and the stepper gas valve, which said existing tubing was otherwise routable from the burner box and the heat exchanger to respective positive and negative control pressure posts of the mechanical modulating gas valve.

18. The method of claim 17, wherein the method includes:
using the electronic differential pressure sensor to determine the pressure differential between the burner box and the heat exchanger of the PAM combustion system; and modulating the outlet pressure of the stepper gas valve to a desired outlet pressure in response to the pressure differential between the burner box and the heat exchanger as determined by the electronic differential pressure sensor.

19. The method of claim 17, wherein the method includes:
using the electronic differential pressure sensor to determine the pressure differential between the burner box and the heat exchanger of the PAM combustion system;

determining a desired outlet pressure for the stepper gas valve at least partially based on the pressure differential between the burner box and the heat exchanger as determined by the electronic differential pressure sensor; and commanding the stepper gas valve to the desired outlet pressure.

20. The method of claim 19, wherein commanding the stepper gas valve to the desired outlet pressure includes driving a stepper motor of the stepper gas valve into a position at which the outlet pressure of the stepper gas valve is modulated to the desired outlet pressure.

21. The method of claim 20, wherein driving the stepper motor of the stepper gas valve into the position at which the outlet pressure of the stepper gas valve is modulated to the desired outlet pressure includes driving the stepper motor based on steps versus an outlet pressure table.

22. The method of claim 17, wherein the method includes:
algorithmically determining a desired outlet pressure for the stepper gas valve based on the pressure differential between the burner box and the heat exchanger as determined by the electronic differential pressure sensor; and driving a stepper motor of the stepper gas valve into a position at which the outlet pressure of the stepper gas valve is modulated to the algorithmically determined desired outlet pressure.

23. The method of claim 17, wherein the method includes:
- looking up the desired outlet pressure for the stepper gas valve based on the pressure differential between the burner box and the heat exchanger as determined by the electronic differential pressure sensor; and
- driving a stepper motor of the stepper gas valve into a position at which the outlet pressure of the stepper gas valve is modulated to the looked up desired outlet pressure.

24. The method of claim 17, wherein the method includes using the electronic differential pressure sensor to control the stepper gas valve to modulate only fuel flow in the PAM combustion system.

25. A method for electronically modulating fuel flow in a pressure augmented modulation (PAM) combustion system including a burner box and a heat exchanger, the method comprising:
- providing an electronic differential pressure sensor in the PAM combustion system such that the electronic differential pressure sensor is operable for determining a pressure differential between the burner box and the heat exchanger of the PAM combustion system;
- providing a stepper gas valve in the PAM combustion system such that the stepper gas valve is operable for modulating its outlet pressure in response to the pressure differential between the burner box and the heat exchanger as determined by the electronic differential pressure sensor; and
- using the electronic differential pressure sensor for the sole purpose of controlling the stepper gas valve to modulate only fuel flow in the PAM combustion system such that the electronic differential pressure sensor is not used for sensing fuel and air pressures for the purpose of adjusting speed of a combustion blower in the PAM combustion system.

26. A method for electronically modulating fuel flow in a pressure augmented modulation (PAM) combustion system including a burner box and a heat exchanger, the method comprising:
- providing an electronic differential pressure sensor in the PAM combustion system such that the electronic differential pressure sensor is operable for determining a pressure differential between the burner box and the heat exchanger of the PAM combustion system;
- providing a stepper gas valve in the PAM combustion system such that the stepper gas valve is operable for modulating its outlet pressure in response to the pressure differential between the burner box and the heat exchanger as determined by the electronic differential pressure sensor;
- using the electronic differential pressure sensor to determine the pressure differential between the burner box and the heat exchanger of the PAM combustion system; and
- algorithmically determining a desired outlet pressure for the stepper gas valve using a linear graph equation of outlet pressure versus pressure difference as measured between a burner box and a heat exchanger of a conventional PAM combustion system including a mechanical modulating gas valve.

27. The method of claim 26, wherein the method includes driving a stepper motor of the stepper gas valve into a position at which the outlet pressure of the stepper gas valve is modulated to the algorithmically determined desired outlet pressure.

28. The method of claim 26, wherein the method includes using the stepper gas valve and the electronic differential pressure sensor instead of and as a replacement of a mechanical modulating gas valve in the PAM combustion system.

29. The method of claim 28, wherein the method includes using existing tubing in the PAM combustion system for the electronic differential pressure sensor and the stepper gas valve, which said existing tubing was otherwise routable from the burner box and the heat exchanger to respective positive and negative control pressure posts of the mechanical modulating gas valve.

30. A method for electronically modulating fuel flow in a pressure augmented modulation (PAM) combustion system including a burner box and a heat exchanger, the method comprising:
- providing an electronic differential pressure sensor in the PAM combustion system such that the electronic differential pressure sensor is operable for determining a pressure differential between the burner box and the heat exchanger of the PAM combustion system;
- providing a stepper gas valve in the PAM combustion system such that the stepper gas valve is operable for modulating its outlet pressure in response to the pressure differential between the burner box and the heat exchanger as determined by the electronic differential pressure sensor; and
- using the stepper gas valve and the electronic differential pressure sensor instead of and as a replacement of a mechanical modulating gas valve in the PAM combustion system;
- wherein the electronic differential pressure sensor is located on the stepper gas valve thereby allowing the stepper gas valve and the electronic differential pressure sensor located thereon to be usable as a drop-in replacement of the mechanical modulating gas valve in the PAM combustion system without requiring modification of an existing integrated furnace control (IFC) of the PAM combustion system, which said existing IFC was otherwise usable with the replaced mechanical modulating gas valve.

31. A method for electronically modulating fuel flow in a pressure augmented modulation (PAM) combustion system including a burner box and a heat exchanger, the method comprising:
- providing an electronic differential pressure sensor in the PAM combustion system such that the electronic differential pressure sensor is operable for determining a pressure differential between the burner box and the heat exchanger of the PAM combustion system;
- providing a stepper gas valve in the PAM combustion system such that the stepper gas valve is operable for modulating its outlet pressure in response to the pressure differential between the burner box and the heat exchanger as determined by the electronic differential pressure sensor; and
- using the stepper gas valve and the electronic differential pressure sensor instead of and as a replacement of a mechanical modulating gas valve in the PAM combustion system;
- wherein the electronic differential pressure sensor is located on an integrated furnace control (IFC) of the PAM combustion system thereby allowing the stepper gas valve to be used in the PAM combustion system without requiring modification of the stepper gas valve to include the electronic differential pressure sensor thereon.

* * * * *